(12) United States Patent
Liu et al.

(10) Patent No.: US 9,292,750 B2
(45) Date of Patent: Mar. 22, 2016

(54) METHOD AND APPARATUS FOR DETECTING TRAFFIC MONITORING VIDEO

(71) Applicants: PEKING UNIVERSITY FOUNDER GROUP CO., LTD., Beijing (CN); BEIJING FOUNDER APABI TECHNOLOGY LTD., Beijing (CN); PEKING UNIVERSITY, Beijing (CN)

(72) Inventors: Yan Liu, Beijing (CN); Xiaoqing Lv, Beijing (CN); Jianbo Xu, Beijing (CN); Zhi Tang, Beijing (CN)

(73) Assignees: PEKING UNIVERSITY FOUNDER GROUP CO., LTD., Beijing (CN); PEKING UNIVERSITY, Beijing (CN); BEIJING FOUNDER APABI TECHNOLOGY LTD., Beijing (CN)

( * ) Notice: Subject to any disclaimer, the term of this patent is extended or adjusted under 35 U.S.C. 154(b) by 162 days.

(21) Appl. No.: 14/092,563

(22) Filed: Nov. 27, 2013

(65) Prior Publication Data

US 2014/0348390 A1 Nov. 27, 2014

(30) Foreign Application Priority Data

May 21, 2013 (CN) .......................... 2013 1 0190180

(51) Int. Cl.
*G06K 9/00* (2006.01)
*G06K 9/34* (2006.01)

(52) U.S. Cl.
CPC .................................. *G06K 9/00785* (2013.01)

(58) Field of Classification Search
CPC ..................................................... G06T 7/2006
See application file for complete search history.

(56) References Cited

U.S. PATENT DOCUMENTS

| 7,860,311 | B2* | 12/2010 | Chen et al. .................... 382/173 |
| 8,787,617 | B2* | 7/2014 | Nishino ........................ 382/103 |
| 2007/0248244 | A1* | 10/2007 | Sato et al. ..................... 382/103 |
| 2009/0238411 | A1* | 9/2009 | Adiletta et al. ............... 382/107 |
| 2012/0019728 | A1* | 1/2012 | Moore .......................... 348/678 |

OTHER PUBLICATIONS

Qu, "Adaptive tracking moving targets based on MACA algorithm", Advanced Materials Research, vol. 211-212, pp. 1-5, 2011.*
Yi et al., "Moving object detection based on running average background and temporal difference", 2010 Conference on ISKE, Nov 2010.*

* cited by examiner

*Primary Examiner* — Soo Park
(74) *Attorney, Agent, or Firm* — Workman Nydegger (57) ABSTRACT

The present invention provides a method and an apparatus for detecting a traffic monitoring video. The method comprises: determining a background reference model; determining a target area image in the traffic monitoring video according to the background reference model; updating the background reference model by using the target area image; summating all target points in detection area of each frame of image in the traffic monitoring video according to the updated background reference model to obtain a total area of all the target points; segmenting the frame with the biggest total area to obtain a target area at the best position; and extracting vehicle information from the target area at the best position. By using the present invention, the accuracy of a detection result in a complex environment may be improved.

17 Claims, 4 Drawing Sheets

METHOD AND APPARATUS FOR DETECTING TRAFFIC MONITORING VIDEO

This application claims the benefit of China Patent Application No. 201310190180.X, filed on May 21, 2013, which is incorporated herein by reference.

FIELD OF THE INVENTION

The present invention relates to the technical field of video detection, in particular to a method and an apparatus for detecting a traffic monitoring video.

BACKGROUND OF THE INVENTION

In order to realize automation and intelligentization of acquisition of road traffic information, the traffic monitoring video is analyzed by adopting a video-based vehicle detection method based on an image processing technology at present to identify the traffic stream speed and vehicle models therein. However, the inventor discovers that the existing analysis method for the traffic monitoring video still has some defects.

For example, a vehicle tracking and detection method based on Kalman filtering, a vehicle detection method based on probability statistics and a vehicle detection method based on differential and curvilinear transformation can not meet the actual needs due to high calculation complexity and poor instantaneity of algorithms.

In order to reduce the calculation quantity, a vehicle segmentation method based on background difference is developed. This method mainly comprises the following contents:
1, motion detection principle
2, differential image binarization
3, calculation of a binary differential image projection value
4, establishment of a projection model of a vehicle
5, judgment of a moving vehicle
This method depending on a binary projection model of the vehicle has two main defects:
(1) establishment of the binary projection model, which depends on the vertical projection or horizontal projection of the vehicle, has requirements on setting detection area to a particular area of a single lane, as the vehicles running in parallel on the road can shield each other. As the vehicles running on the road across adjacent lanes frequently, the reliability of the acquired profile projection is difficult to guarantee;
(2) in a complex environment, a reliable vehicle binary model can not be obtained from a differential image, so that the accuracy of this method is low.

SUMMARY OF THE INVENTION

Embodiments of the present invention provide a method and an apparatus for detecting a traffic monitoring video to improve the accuracy of a detection result in a complex environment.

For this purpose, the embodiments of the present invention provide the following technical solution:
a method for detecting a traffic monitoring video includes:
determining a background reference model;
determining a target area image in the traffic monitoring video according to the background reference model;
updating the background reference model by using the target area image;
summating all target points in detection area of each frame of image in the traffic monitoring video according to the updated background reference model to obtain a total area of all the target points; and
segmenting the frame with the biggest total area to obtain a target area at the best position.

Preferably, the determining the background reference model includes:
taking the mean value of initial set frames of images as the background reference model.

Preferably, the determining the target area image in the traffic monitoring video according to the background reference model includes:
extracting a changed area in the image by using the difference between adjacent frames in an image sequence to obtain an inter-frame differential image;
extracting a target area in the image by using the difference between the image sequence and the background reference model to obtain a background differential image;
performing logical OR operation on the inter-frame differential image and the background differential image; and
filling and de-noising the operated image to obtain a complete target area.

Preferably, the updating the background reference model by using the target area image includes:
the updated background reference model is:

$$b_{t+1}(x, y) = \begin{cases} b_t(x, y) & O_t(x, y) = 255 \\ \alpha f_t(x, y) + (1-\alpha) b_t(x, y) & O_t(x, y) = 0 \end{cases},$$

wherein $b_t(x, y)$ represents the background reference model, $b_{t+1}(x, y)$ represents the updated background reference model, $f_t(x, y)$ represents an image at a moment t in the traffic monitoring video, x, y are pixel coordinates, $O_t(x, y)$ represents a target area image at the moment t, and $\alpha$ is a coefficient related to a background model updating rate.

Preferably, the method also includes:
extracting vehicle information from the target area at the best position.

Preferably, the vehicle information includes at least one of vehicle model, vehicle speed and traffic volume.

An apparatus for detecting a traffic monitoring video includes:
a modeling module, configured to determine a background reference model;
a target area determining module, configured to determine a target area image in the traffic monitoring video according to the background reference model;
a model updating module, configured to update the background reference model by using the target area image;
a projection peak detecting module, configured to summate all target points in detection area of each frame of image in the traffic monitoring video according to the updated background reference model to obtain a total area of all the target points; and
a target area segmenting module, configured to segment the frame with the biggest total area to obtain a target area at the best position.

Preferably, the modeling module is specifically configured to take the mean value of initial set frames of images as the background reference model.

Preferably, the target area determining module includes:
an inter-frame differential extracting unit, configured to extract a changed area in the image by using the difference between adjacent frames in an image sequence to obtain an inter-frame differential image;

a background differential extracting unit, configured to extract a target area in the image by using the difference between the image sequence and the background reference model to obtain a background differential image;

a differential images fusing unit, configured to perform logical OR operation on the inter-frame differential image and the background differential image; and a de-noising processing unit, configured to fill and de-noise the operated image to obtain a complete target area.

Preferably, the model updating module is specifically configured to update the background reference model according to the following mode:

$$b_{t+1}(x, y) = \begin{cases} b_t(x, y) & O_t(x, y) = 255 \\ \alpha f_t(x, y) + (1-\alpha)b_t(x, y) & O_t(x, y) = 0 \end{cases} ;$$

wherein $b_t(x, y)$ represents the background reference model, $b_{t+1}(x, y)$ represents the updated background reference model, $f_t(x, y)$ represents an image at a moment t in the traffic monitoring video, x, y are pixel coordinates, $O_t(x, y)$ represents the target area image at the moment t, and $\alpha$ is a coefficient related to the background model updating rate.

Preferably, the apparatus also includes: a vehicle information extracting module, configured to extract vehicle information from the target area at the best position.

According to the method and the apparatus for detecting the traffic monitoring video provided in the embodiments of the present invention, the target area at the best position is obtained by using peak detection based on the obtained substantially-complete target area image, namely a vehicle body. Setting of a key threshold is not needed, and the problem of poor generality of algorithm due to change of an external environment is solved. The optimal position is detected by using the vehicle model determined by peak detection, and this is insensitive to installation angles and changes of focal distances of cameras, thus greatly improving the accuracy of the detection result in the complex environment.

DETAILED DESCRIPTION OF THE EMBODIMENTS

The present invention is described in detail below with reference to the accompanying drawings and in conjunction with the embodiments.

Figure 1:
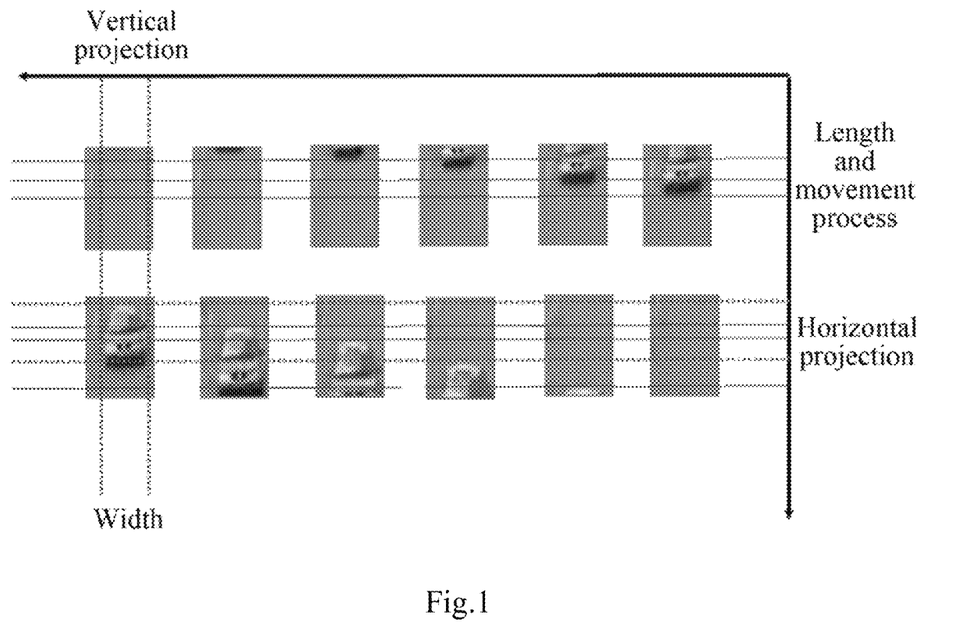
FIG. 1 is a schematic diagram of a movement process of a vehicle in an embodiment of the present invention.

According to analysis of a movement change curve of a vehicle in a detection area, a result shows that the projection curve accords with the characteristic of first ascending and then descending in the process from the vehicle entering to leaving the detection area, such as in the movement process of the vehicle shown in FIG. 1, in which the solid lines represent a vehicle entry process, and the dash lines represent an optimal vehicle model detection position. According to the characteristic, the problem of poor adaptability of a vehicle detection algorithm due to setting of a threshold is solved by adopting a projection peak curve in a method for detecting a traffic monitoring video according to an embodiment of the present invention, the span of the peak curve is in direct proportion to the vehicle speed, the height of the peak is related to the vehicle model, the vehicle model may be roughly and directly classified through the peak and finely classified through a vehicle body binary image obtained by segmentation at the peak by using a neural network, the number of vehicles is in one-to-one correspondence with the number of peaks, and one peak span can track the movement trajectory of a vehicle, and can be used for other related detection of vehicle movement abnormity and the like.

Figure 2:
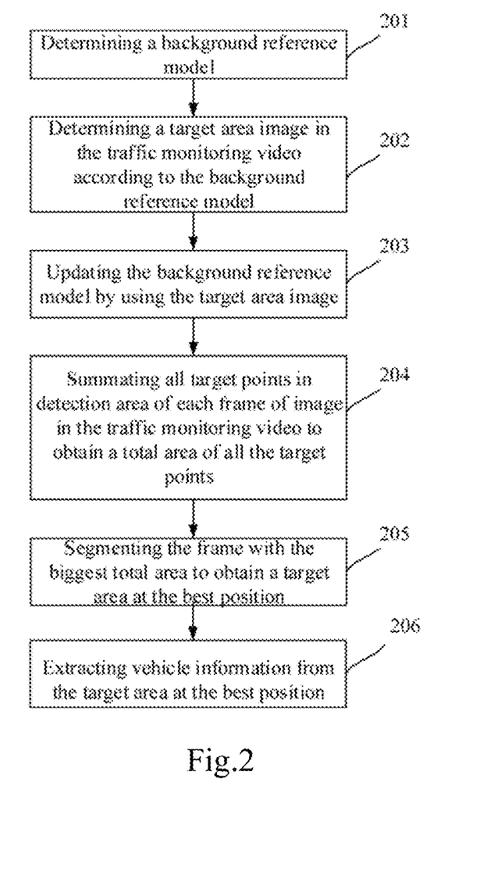
FIG. 2 is a flowchart of a method for detecting a traffic monitoring video in an embodiment of the present invention.

FIG. 2 shows a flowchart of a method for detecting a traffic monitoring video in an embodiment of the present invention. The method includes the following steps:

step 201, determining a background reference model.

That is to say, modeling an initial background image.

A frame $f_t(x, y)$ is given, wherein t is a time sequence of the frame, x, y are pixel coordinates of the frame, and the mean value of initial N frames of images is used as an initial background.

In order to improve the efficiency, only an ROI (Region Of Interest) may be modeled.

$$b_t(x, y) = \sum_{t=0}^{N-1} f_t(x, y)/N \quad (1)$$

Step 202, determining a target area image in the traffic monitoring video according to the background reference model.

That is to say, segmenting a target area. The target area indicates a movement area in the ROI, namely a vehicle.

In this embodiment, the target area image may be determined by adopting a method of combining background difference and inter-frame difference. Specifically:

the inter-frame difference method utilizes the difference between adjacent frames in an image sequence to extract a changed area in an image, and this method may roughly determine the position of a moving object, has strong adaptability to a dynamic environment and is affected little by changes of light, but merely detects an object in relative movement, is not quite accurate in positioning, can not provide complete information of the moving object and is insensitive to a static object. The image obtained through the inter-frame difference is expressed as $d_t(x, y)$ $$d_t(x, y) = \begin{cases} 0 & \text{if} |f_t(x, y) - f_{t-1}(x, y)| < \eta_{Thres} \\ 255 & \text{else} \end{cases} \quad (2)$$

wherein $\eta_{Thres}$ is a binary threshold of the inter-frame difference method, which is not required to be particularly accurate, and is generally [20, 50].

The background difference method utilizes the difference between the image sequence and the background reference model to extract the ROI in the image, this method can generally provide relatively complete target information and is accurate in positioning, but this method is relatively sensitive to changes of the dynamic scene caused by light and external conditions, and the effect of this method depends on the accuracy of the background model. The image obtained through the background difference is expressed as $h_t(x, y)$:

$$h_t(x, y) = \begin{cases} 0 & \text{if } |f_t(x, y) - b_t(x, y)| < \mu_{Thres} \\ 255 & \text{else} \end{cases} \quad (3)$$

wherein $\mu_{Thres}$ is a binary threshold of the background difference method.

In combination with the characteristics that the background difference is complete in segmentation but sensitive to the light and the inter-frame difference is incomplete in segmentation but insensitive to the light, logical OR operation is performed on the two kinds of differential images to ensure that points belonging to a vehicle target are not lost as much as possible, and then a relatively complete vehicle body is segmented after filling and de-noising through morphological operation. The logical OR operation of the differential images is expressed as:

$$D_t(x, y) = h_t(x, y) \| d_t(x, y) \quad (4).$$

Then, small isolated points in the detection area are eliminated through morphological open operation, and the calculation formula is as follows:

$$O_t(x, y) = D_t(x, y) \circ S = [D_t(x, y) \ominus S] \oplus S \quad (5),$$

wherein $O_t(x, y)$ represents an output image obtained through the morphological open operation, and S is a structural element.

It should be noted that, in practical application, the target area image in the traffic monitoring video can also be determined by adopting other modes in the above-mentioned step 202, such as a method based on the inter-frame difference, a method based on a color histogram, a method based on contour detection and a method based on texture statistics, and this is not limited in the embodiments of the present invention.

Step 203, updating the background reference model by using the target area image.

In order to enhance the adaptability of the background model, relatively complete information of the changed area can not be provided only by means of background difference and the inter-frame difference which are different from the commonly used Surenda background modeling method. In the embodiment of the present invention, the image fused by adopting formula (5) is used as a MASK for background update, thus well ensuring that the ROI will not be calculated. The automatic background updating model is expressed as:

$$b_{t+1}(x, y) = \begin{cases} b_t(x, y) & O_t(x, y) = 255 \\ \alpha f_t(x, y) + (1-\alpha) b_t(x, y) & O_t(x, y) = 0 \end{cases} \quad (6),$$

wherein $\alpha$ is a coefficient related to a background model updating rate.

Step 204, summating all target points in detection area of each frame of image in the traffic monitoring video according to the updated background reference model to obtain a total area of all the target points.

The detection area is the ROI. Specifically, in the ROI, inter-frame difference operation is performed on a current frame and a background frame according to the updated background reference model, pixel points corresponding to a moving object are extracted, then the target points are vertically or horizontally projected, and the area of the target points in the vertical or horizontal direction of the moving object area is calculated. Since calculation of the area of the target points based on the horizontal projection and vertical projection includes summation in two directions respectively, although the directions for the calculation are different, the area of the corresponding target points is equal.

Figure 3:
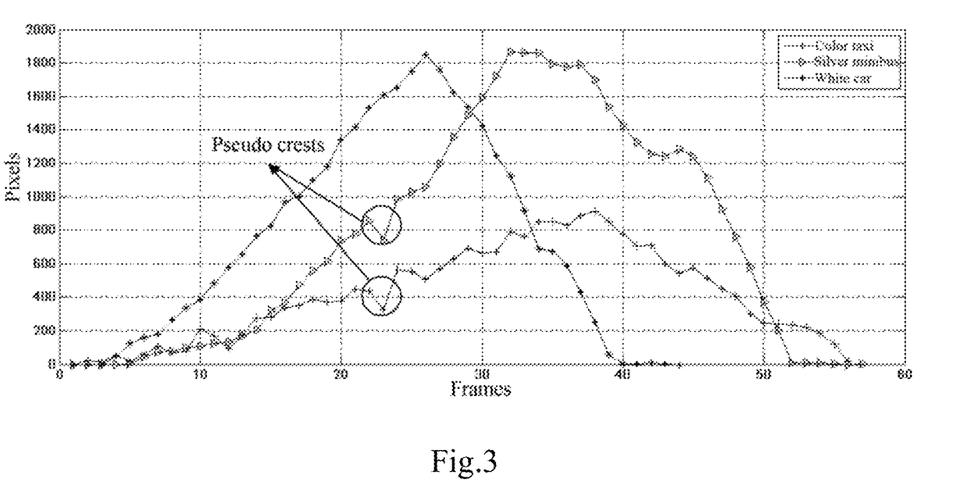
FIG. 3 is a schematic diagram of movement trajectory projection curves of different vehicles in an embodiment of the present invention.

FIG. 3 shows that the movement trajectory of a vehicle in a video sequence forms approximately a waveform curve through projection statistics. The movement of each vehicle forms a crest, and through this waveform signal, not only can vehicle detection be realized, but also the vehicle speed and the like can be estimated. Herein, the area of the moving object obtained by horizontal projection calculation is:

$$N_{Horizon}(t) = \sum_{j=0}^{h-1} \sum_{i=0}^{w-1} O_t(x, y), \quad (7)$$

wherein h and w express the height and the width of ROI respectively, and t is a frame time sequence number. Change of $N_{Horizon}(t)$ is detected by adopting a frame-by-frame search method in peak detection, and the highest value is determined as a peak.

The method for calculating the area of the moving object through vertical projection is similar to the above-mentioned method, and is not described again herein.

Step 205, segmenting the frame with the biggest total area to obtain a target area at the best position.

That is to say, the best position for vehicle model detection is obtained through peak analysis of the movement curve in the above-mentioned step 204.

The peak is determined as the best vehicle model detection point. After this frame is acquired, ROI $G_t(x, y)$ at the best position, namely the target area, is obtained through segmentation by adopting a maximal outer contour detection method.

Further, step 206, in the embodiment of the present invention, vehicle information can also be acquired from the target area at the best position, and the vehicle information may include at least one of vehicle model, vehicle speed and traffic volume.

Specifically, the ROI is equally divided into 16 blocks, the area ratio of a $G_t(x, y)$ subarea to the background in each block is respectively judged and compared with a vehicle model template, the most proximal one is the approximate vehicle model, which is rough classification in the case of long shot. If fine classification is needed, GPA (General Procrustes Analysis) algorithm may be utilized. Firstly, a mass center is calculated according to the outer contour of $G_t(x, y)$, and the formula is as follows:

$$\bar{x} = \frac{x_1 + x_2 + \ldots + x_n}{n}, \quad (8),$$
$$\bar{y} = \frac{y_1 + y_2 + \ldots + y_n}{n},$$

wherein $(x_i, y_i)$ represents pixel coordinates of the $i^{th}$ point, n is the sum of pixel points, and $(\bar{x}, \bar{y})$ represents coordinates of the mass center.

In order to perform vehicle model template matching comparison on images shot at different focal distances, scale normalization is needed, and the formula is as follows:

$$s = \sqrt{\frac{(x_1 - \bar{x}) + (y_1 - \bar{y}) + \ldots}{n}}, \quad (9)$$

wherein s is a scale factor, the first M maximal curvature points $C_M(x_j, y_j)$ on the contour are taken as angular points, and j is corresponding pixel points and, j=1, 2 ... M. After scale normalization, coordinates of each point are changed into $C_M((x_j-\bar{x})/s, (y_j-\bar{y})/s)$.

In order to compare the similarity between vehicle models, Euclidean distance measure can be used. Herein, in order to resist the influence of a rotating angle, $G_t(x, y)$ is in the same direction as the template, so when a Euclidean distance is calculated, the vehicle models are matched according to the sequence of big-to-small curvature, and the template with the shortest Euclidean distance is the corresponding vehicle model.

The number of vehicles is in one-to-one correspondence with the number of peaks. Calculation of average vehicle speed needs to consider the span of a peak, namely the number N of spanned frames, the video sampling rate is f frame/s, the length of a corresponding road is L, which is the height of the ROI mapped in the world coordinate system, and the calculation expression of the vehicle speed v is:

$$v=L/(N/f) \quad (10).$$

In practical engineering application, due to the difference of service environments, the specific implementation of the method for detecting the traffic monitoring video in the embodiment of the present invention may have different modes. Generally, in a traffic information acquisition system, a camera is installed at a high position above the road, in this way, a depression angle is obtained, and many lanes are covered, but detailed information of vehicles, such as fine classification of vehicle models, license plates and drivers, is often easily lost. In traffic information acquisition systems installed in public places such as residential areas and campuses, cameras are generally installed in right front of roads, on lateral sides of the roads or at places 5 to 6 meters above the roads, but long shot cameras are generally used for panorama monitoring, and close shot cameras are used for extracting detailed information of the vehicles.

No matter which of the above cases is involved, the traffic volume and the vehicle speed can be accurately extracted and the index value t of the optimal vehicle model detection frame is accurately calculated by using the method for detecting the traffic monitoring video in the embodiment of the present invention, the only difference lies in that the resolution of long shot images shot in the first case is already very low, so the vehicle model identification part adopts rough matching, namely only big, medium and small vehicle models are distinguished. The resolution of close shot images shot in the second case is relatively high, so vehicle model classification can be made precisely, vehicles can be divided into sedans, off-road vehicles, pickup trucks, minibuses, buses, trucks and the like, and for fine classification, the vehicle models can be further precisely classified. Specifically, a maximal outer contour area may be extracted from a corresponding image at a peak by adopting a maximal outer contour detection method, then filling operation is performed to obtain an accurately segmented vehicle target model, and the target model is mathematically modeled by adopting a curvature detection method. The images shot at different angles and different focal distances, even the same object, have great difference; in order to enhance the adaptability of the algorithm, the mathematical model is corrected by adopting a GPA algorithm, so that the mathematical model is rotationally invariant and scale invariant; and then, similarity comparison between the model and the mathematical model of each template in a library is performed by adopting an Euclidean distance measure method to determine the vehicle model. Due to the relative independence of each link of the algorithm, the types of vehicle models can be added or deleted at any time, thus facilitating engineering realization. Moreover, this does not produce coupling influence on traffic volume statistics and vehicle speed calculation.

The frame-by-frame peak search mode adopted in the optimal projection peak search process is likely to cause the problem of pseudo peaks shown in FIG. 3, which is mainly resulted from short-time disturbance caused by factors such as camera dithering. In order to solve this problem, step length detection control can be added in practical application, and if the step length covered by the span of a peak is smaller than 15 frames, the peak can be abandoned, and the search is continued.

In addition, in actual detection, not all ROIs are rectangular and may also be in actual shapes of roads, formula (7) needs to be slightly changed (the principle is the same) during calculation, and the calculated range is changed to the actual coverage of each ROI. When the average vehicle speed V is calculated, only the actual length L of the road of each ROI in the corresponding world coordinate system needs to be changed to the actual road detection length. Estimation is performed according to the processing speed, and the algorithm is applicable to all occasions with the vehicle speed ≤400 km/h.

The method in the embodiment of the present invention is used for detecting PCPM (Projection Curve Peak Measurement) information of the vehicle based on the projection curve peak, and compared with the prior art, has the following advantages:

(1) through combining the background difference and inter-frame difference methods, the construction of the background model does not depend on the precise background model any more, that is to say, the condition whether the segmented vehicle main body is complete or not is not necessary, and with such lowered requirement, thus the interference caused by camera jittering is substantially overcome, based on the substantial complete segmentation of the vehicle main body. The background difference may be used for obtaining more complete vehicle information but is sensitive to light change, the inter-frame difference is insensitive to the light change but can not be used for obtaining complete vehicle information, and the two methods are logically fused herein, thus ensuring the integrity of the vehicle body, also avoiding loss of movement information and providing necessary basis for updating of the background model;

(2) the obtained substantially complete vehicle body is vertically and horizontally projected respectively to obtain projection change curves caused by movement of the vehicle body in two directions, and the two curves are both functions of time. Information such as optimal position, vehicle speed and traffic volume of vehicle model detection is obtained through peak analysis of the movement curves. The whole detection process utilizes the peaks detection and does not need to set a key threshold, thus solving the problem of poor generality of algorithm caused by change of the external environment. The optimal position is detected by using the vehicle model determined by peak detection, and matching of vehicle models is realized by adopting the GPA algorithm, so the method is insensitive to installation angles and changes of focal distances of cameras;

(3) the installation angles of the cameras are not severely required, and only need to ensure that the lane area is covered no matter the cameras are installed at the front side or at a lateral side. The method according to the embodiment of the present invention has good instantaneity, the processing speed on TMS320DM642 is ensured about 20 frames per second, which is greater than the video transmission rate of 15 frames per second, and the processing speed on a common PC can reach about 50 frames per second.

Figure 4:
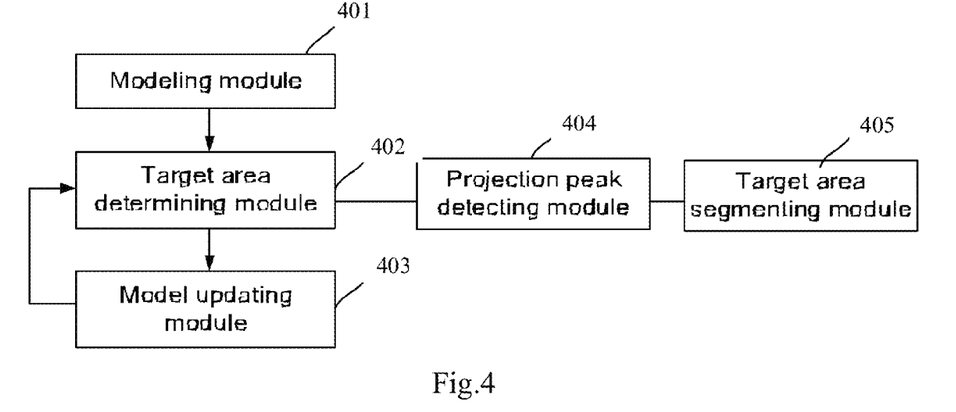
FIG. 4 is a structural schematic diagram of an apparatus for detecting a traffic monitoring video in an embodiment of the present invention.

Correspondingly, an embodiment of the present invention also provides an apparatus for detecting a traffic monitoring video. FIG. 4 shows a structural schematic diagram of the apparatus.

In this embodiment, the apparatus comprises:
a modeling module 401, configured to determine a background reference model;
a target area determining module 402, configured to determine a target area image in the traffic monitoring video according to the background reference model;
a model updating module 403, configured to update the background reference model by using the target area image;
a projection peak detecting module 404, configured to summate all target points in detection area of each frame of image in the traffic monitoring video according to the updated background reference model to obtain a total area of all the target points; and
a target area segmenting module 405, configured to segment the frame with the biggest total area to obtain a target area at the best position.

The above-mentioned modeling module 401 specifically may take the mean value of initial set frames of images as the background reference model.

A specific implementation of the target area determining module 402 includes:
an inter-frame differential extracting unit, configured to extract a changed area in the image by using the difference between adjacent frames in an image sequence to obtain an inter-frame differential image;
a background differential extracting unit, configured to extract a target area in the image by using the difference between the image sequence and the background reference model to obtain a background differential image;
a differential image fusing unit, configured to perform logical OR operation on the inter-frame differential image and the background differential image; and
a de-noising processing unit, configured to fill and de-noise the operated image to obtain a complete target area.

Of course, in practical application, the target area determining module 402 may also be implemented in other ways, and this is not limited in the embodiment of the present invention.

The above-mentioned model updating module 403 specifically may update the background reference model in the following way:

$$b_{t+1}(x, y) = \begin{cases} b_t(x, y) & O_t(x, y) = 255 \\ \alpha f_t(x, y) + (1 - \alpha)b_t(x, y) & O_t(x, y) = 0 \end{cases},$$

wherein $b_t(x, y)$ represents the background reference model, $b_{t+1}(x, y)$ represents the updated background reference model, $f_t(x, y)$ represents an image at a moment t in the traffic monitoring video, x, y are pixel coordinates, $O_t(x, y)$ represents the target area image at the moment t, and $\alpha$ is a coefficient related to the background model updating rate.

According to the apparatus for detecting the traffic monitoring video provided in the embodiment of the present invention, the target area at the best position is obtained by using peak detection based on the obtained substantially-complete target area image, namely a vehicle body. Setting of a key threshold is not needed, and the problem of poor generality of algorithm caused by change of the external environment is solved. The optimal position is detected by using the vehicle model determined by peak detection, and this is insensitive to installation angles and changes of focal distances of cameras, thus greatly improving the accuracy of the detection result in a complex environment.

Figure 5:
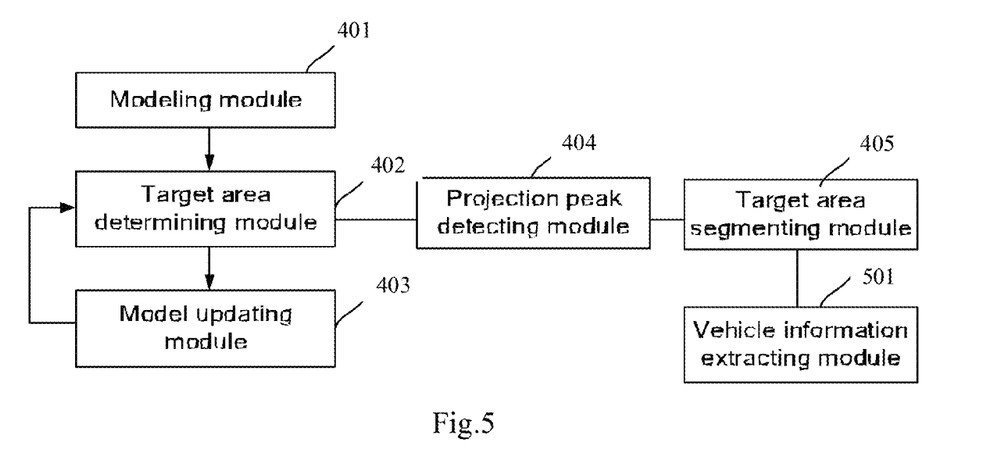
FIG. 5 is another structural schematic diagram of an apparatus for detecting a traffic monitoring video in an embodiment of the present invention.

Further, as shown in FIG. 5, the apparatus for detecting the traffic monitoring video may also includes: a vehicle information extracting module 501, configured to extract vehicle information from the target area at the best position.

The vehicle information may include at least one of vehicle model, vehicle speed and traffic volume.

The embodiments in the description are described in a progressive way, the same or similar parts of the embodiments may refer to each other, and the contents mainly described in the embodiments are all the differences from other embodiments. Particularly, with respect to the embodiment of the system, since it is substantially similar to the embodiment of the method, it is described relatively simply, and for the related parts, please refer to the parts of the description of the embodiments of the method.

Apparently, it should be appreciated by those skilled in the art that the above-mentioned modules or steps of the present invention may be implemented by a general computing device. The modules or steps may be integrated in a single computing device or distributed in a network consisting of a plurality of computing devices. Alternatively, the modules or steps may be implemented by executable program codes of the computing device, thus the modules or steps may be stored in a storage apparatus and executed by the computing device, or made into integrated circuit modules respectively, or a plurality of the modules or steps are made into a single integrated circuit module for implementation. In this way, the present invention is not limited to any specific combination of hardware and software.

The foregoing descriptions are merely preferred embodiments of the present invention, rather than limiting the present invention. For those skilled in the art, the present invention may have various modifications and alterations. Any modification, equivalent substitution, improvement or the like made within the spirit and principle of the present invention shall fall into the protection scope of the present invention.

The invention claimed is:

1. A method for detecting a traffic monitoring video, comprising:
determining a background reference model;
determining an initial target region of a moving object in the traffic monitoring video according to the background reference model;
updating the background reference model by using the initial target region;
determining an intermediate target region of the moving object in each frame of image according to the updated background reference model;
determining a projection area of each determined intermediate target region in corresponding frame of image in vertical or horizontal direction, and determining a movement curve including a plurality of determined projection areas respectively corresponding to a plurality of frames of images, and determining the frame with the projection area in the peak of the movement curve is the frame with a biggest total area;

determining the intermediate target region in the frame with the biggest total area is a best position of the moving object; and segmenting the intermediate target region from the frame with the biggest total area to obtain a ultimate target region at the best position.

2. The method according to claim 1, wherein the determining the background reference model comprises:

taking a mean value of initial set frames of images as the background reference model.

3. The method according to claim 1, wherein the determining the initial target region of the moving object in the traffic monitoring video according to the background reference model comprises:

extracting a changed region in an image by using a difference between adjacent frames in an image sequence to obtain an inter-frame differential image;

extracting a target region in the image by using a difference between the image sequence and the background reference model to obtain a background differential image;

performing logical OR operation on the inter-frame differential image and the background differential image; and filling and de-noising the operated image to obtain a complete target region as the initial target region.

4. The method according to claim 1, wherein the updating the background reference model by using the initial target region comprises:

the updated background reference model is:

$$b_{t+1}(x, y) = \begin{cases} b_t(x, y) & O_t(x, y) = 255 \\ \alpha f_t(x, y) + (1-\alpha)b_t(x, y) & O_t(x, y) = 0 \end{cases},$$

wherein $b_t(x, y)$ represents the background reference model, $b_{t+1}(x, y)$ represents the updated background reference model, $f_t(x, y)$ represents an image at a moment t in the traffic monitoring video, x,y are pixel coordinates, $O_t(x, y)$ represents the initial target region at the moment t, and $\alpha$ is a coefficient related to a background model updating rate.

5. The method according to claim 1, wherein the segmenting the intermediate target region from the frame with the biggest total area to obtain a ultimate target region at the best position comprises:

obtaining $ROI^G_{t'}(x,y)$ at the best position, namely the ultimate target region, through segmentation by adopting a maximal outer contour detection method.

6. The method according to claim 1, further comprising:

extracting vehicle information from the ultimate target region at the best position.

7. The method according to claim 6, wherein the vehicle information comprises at least one of vehicle model, vehicle speed and traffic volume.

8. The method according to claim 1, wherein determining a intermediate target region of the moving object in each frame of image according to the updated background reference model comprises:

performing inter-frame difference operation respectively on each frame and a background frame according to the updated background reference model;

determining the result of performing inter-frame difference operation on each frame as the intermediate target region of the moving object in each frame.

9. The method according to claim 1, wherein determining the projection area of each determined intermediate target region in corresponding frame of image in vertical or horizontal direction, and determining the movement curve including a plurality of determined projection areas respectively corresponding to a plurality of frames of images comprises:

determining the projection area of each intermediate target region in each frame of image in vertical or horizontal direction according a projection equation of $$N_{Direction}(t) = \sum_{j=0}^{h-1} \sum_{i=0}^{w-1} O_t(x, y),$$

wherein, t represents a frame time sequence number, $N^{Direction}(t)$ represents the projection area of intermediate target region in t-th frame in vertical or horizontal direction, x and y represent pixel coordinates, h represents the height of ROI, w represents the width of ROI, $O_t(x, y) = D_t(x, y) \circ S = [D_t(x, y) \ominus S] \oplus S$ $O_t(x, y)$ represents an output region obtained through a morphological open operation, S represents a structural element, $D_t(x, y) = h_t(x, y) \| d_t(x, y)$, $$h_t(x, y) = \begin{cases} 0 & \text{if } |f_t(x, y) - b_t(x, y)| < \mu_{Thres} \\ 255 & \text{else} \end{cases},$$

$$d_t(x, y) = \begin{cases} 0 & \text{if } |f_t(x, y) - f_{t-1}(x, y)| < \eta_{Thres} \\ 255 & \text{else} \end{cases},$$

$D_t(x, y)$ represents differential image, $h_t(x, y)$ represents image obtained through the background difference, $d^r t(x, y)$ represents image obtained through inter-frame difference, $\eta_{Thres}$ represents a binary threshold of the inter-frame difference, $\mu_{Thres}$ represents a binary threshold of the background difference;

obtaining the movement curve through mapping a plurality of determined projection areas respectively corresponding to a plurality of frames of images in time domain.

10. An apparatus for detecting a traffic monitoring video, comprising at least one processor and at least one memory, wherein the at least one memory stores program codes configured, when executed by the at least one processor, to cause the apparatus to:

a modeling module, configured to determine a background reference model;

determine an initial target region of a moving object in the traffic monitoring video according to the background reference model;

update the background reference model by using the initial target region;

determine an intermediate target region of the moving object in each frame of image according to the updated background reference model;

determine a projection area of each determined intermediate target region in corresponding frame of image in vertical or horizontal direction, and determine a movement curve including a plurality of determined projection areas respectively corresponding to a plurality of frames of images, and determine the frame with the projection area in the peak of the movement curve is the frame with the biggest total area;

determine the intermediate target region in the frame with the biggest total area is a best position of the moving object and segment the intermediate target region from the frame with the biggest total area to obtain a ultimate target region at the best position.

11. The apparatus according to claim 10, wherein the program codes are configured, when executed by the at least one processor, to cause the apparatus to:

take a mean value of initial set frames of images as the background reference model.

12. The apparatus according to claim 10, wherein the program codes are configured, when executed by the at least one processor, to cause the apparatus to:

extract a changed region in an image by using a difference between adjacent frames in an image sequence to obtain an inter-frame differential image;

extract a target region in the image by using a difference between the image sequence and the background reference model to obtain a background differential image;

perform logical OR operation on the inter-frame differential image and the background differential image; and fill and de-noise the operated image to obtain a complete target region as the initial target region.

13. The apparatus according to claim 10, wherein, the program codes are configured, when executed by the at least one processor, to cause the apparatus to:

update the background reference model according to a following mode:

$$b_{t+1}(x, y) = \begin{cases} b_t(x, y) & O_t(x, y) = 255 \\ \alpha f_t(x, y) + (1 - \alpha) b_t(x, y) & O_t(x, y) = 0 \end{cases},$$

wherein $b_t(x, y)$ represents the background reference model, $b_{t+1}(x, y)$ represents the updated background reference model, $f_t(x, y)$ represents an image at a moment t in the traffic monitoring video, x,y are pixel coordinates, $O_t(x, y)$ represents the initial target region at the moment t, and $\alpha$ is a coefficient related to the background model updating rate.

14. The apparatus according to claim 10, wherein the program codes are configured, when executed by the at least one processor, to cause the apparatus to obtain $ROI^G_t(x, y)$ at the best position, namely the ultimate target region, through segmentation by adopting a maximal outer contour detection method.

15. The apparatus according to claim 10, wherein the program codes are configured, when executed by the at least one processor, to cause the apparatus to:

extract vehicle information from the ultimate target region at the best position.

16. The apparatus according to claim 10, wherein the program codes are configured, when executed by the at least one processor, to cause the apparatus to:

perform inter-frame difference operation respectively on each frame and a background frame according to the updated background reference model; and to determine the result of performing inter-frame difference operation on each frame as the intermediate target region of the moving object in each frame.

17. The apparatus according to claim 10, wherein the program codes are configured, when executed by the at least one processor, to cause the apparatus to:

determine the projection area of each intermediate target region in each frame of image in vertical or horizontal direction according a projection equation of $$N_{Direction}(t) = \sum_{j=0}^{h-1} \sum_{i=0}^{w-1} O_t(x, y),$$

wherein, t represents a frame time sequence number, $N_{Direction}(t)$ represents the projection area of intermediate target region in t-th frame in vertical or horizontal direction, x and y represent pixel coordinates, h represents the height of ROI, w represents the width of ROI, $O_t(x, y) = D_t(x, y) \circ S = [D_t(x, y) \ominus S] \oplus S$, $O_t(x, y)$ represents an output region obtained through a morphological open operation, S represents a structural element, $$h_t(x, y) = \begin{cases} 0 & \text{if } |f_t(x, y) - b_t(x, y)| < \mu_{Thres} \\ 255 & \text{else} \end{cases},$$

$$d_t(x, y) = \begin{cases} 0 & \text{if } |f_t(x, y) - f_{t-1}(x, y)| < \eta_{Thres} \\ 255 & \text{else} \end{cases},$$

$D_t(x, y)$ represents differential image, $h_t(x, y)$ represents image obtained through the background difference, $d^t(x, Y)$ represents image obtained through inter-frame difference, $\eta_{Thres}$ represents a binary threshold of the inter-frame difference, $\mu_{Thres}$ represents a binary threshold of the background difference; and to obtain the movement curve through mapping a plurality of determined projection areas respectively corresponding to a plurality of frames of images in time domain.

* * * * *